United States Patent [19]

Brown

[11] Patent Number: 4,602,336

[45] Date of Patent: Jul. 22, 1986

[54] GUIDANCE SYSTEMS

[75] Inventor: George Brown, Benfleet, England

[73] Assignee: GEC Avionics Limited, Rochester, England

[21] Appl. No.: 494,916

[22] Filed: May 16, 1983

[51] Int. Cl.[4] .................. G06F 15/50; G01S 13/89
[52] U.S. Cl. ..................... 364/456; 343/5 MM; 364/460
[58] Field of Search ............ 364/443, 444, 456, 460, 364/423, 728; 343/5 MM

[56] References Cited

U.S. PATENT DOCUMENTS

| | | | |
|---|---|---|---|
| 4,163,231 | 7/1979 | Zuerndorfer et al. | 343/5 MM |
| 4,164,728 | 8/1979 | Marsh | 364/728 X |
| 4,175,285 | 11/1979 | Dansac et al. | 364/456 |
| 4,224,669 | 9/1980 | Brame | 364/443 |
| 4,242,962 | 1/1981 | Wakeman et al. | 102/213 |
| 4,449,193 | 5/1984 | Tournois | 364/604 |
| 4,484,192 | 11/1984 | Seitz et al. | 364/460 X |

FOREIGN PATENT DOCUMENTS

| | | | |
|---|---|---|---|
| 2025722 | 1/1980 | United Kingdom | 364/443 |
| 2025723 | 1/1980 | United Kingdom | 343/5 MM |
| 2060306 | 4/1981 | United Kingdom | 364/443 |

OTHER PUBLICATIONS

Ormsby, Charles C., "Advanced Scene Matching Techniques", IEEE, Proceeding of NMECON, May 15–17, 1979, pp. 68–77.
Slack et al.: Boeing Shaped Scan Correlator (Bossco) Proceedings Soc. Photo Opt. Instrument. Eng. SPIE, vol. 238, Image Processing for Missile Guidance 1980 pp. 19–27.
Carr et al.: Digital Scene Matching Area Correlator (DSMAC) SPIE, vol. 238-1980, pp. 36–41.
Anuta et al.: Map Matching System, IBM Technical Disclosure Bulletin, vol. 7, No. 5, Oct. 1964, p. 372/3.

Primary Examiner—Felix D. Gruber
Attorney, Agent, or Firm—Spencer & Frank

[57] ABSTRACT

A guidance method which enables a moving body to be guided to a predetermined location by allowing the body to view its surroundings and to compare the viewed scene with a reference pattern stored on the body. A number of individual reference patterns are stored, and each reference pattern corresponds to an area of the surroundings which is very much smaller than the field of view and thus the body identifies its position by correlating its field of view with one of the reference patterns. To enable the body to identify its position, even if it deviates from an expected path, a number of reference patterns are laterally displaced from the expected path. The extent of the lateral displacements reduces with decreasing distance from a predetermined location to which the body is to be guided.

6 Claims, 4 Drawing Figures

GUIDANCE SYSTEMS

BACKGROUND OF THE INVENTION

This invention relates to guidance systems and is particularly concerned with systems in which a moving body is to be guided to a predetermined location. One method of enabling a body to determine its position is by allowing it to view its surroundings and to compare its field of view with a reference pattern. The process of identifying the viewed scene with a reference pattern is often termed correlation. In principle, correlation, whether it is of a one or two dimensional nature, involves searching for a particular signal or data pattern within a temporal or spatial window in another signal or data pattern. In the present invention, the signals or data patterns represent two dimensional images and thus one image is being searched for within another image, i.e. the two images are of different sizes, one being a sub-set of the other.

This aspect of correlation is sometimes termed "scene imaging by area correlation" and it can be used to bring a moving body to a predetermined location and to cause it to follow a predetermined path. It is merely necessary for the body to view its surroundings as it moves, and to compare the viewed scene with reference data relating to localised reference areas along its path. As the viewed scene is periodically correlated with the localised reference areas, the moving body can determine whether it is on the required path or whether it diverges from it, and in the latter case correction can be applied.

It is customary for the reference areas to be very much larger than the field of view so that the guidance system has the task of searching through a relatively large reference area to determine whether any portion of it correlates with its current field of view. A relatively large area is usually used since one can fairly be certain that it will contain a large number of well distributed prominent visual features of a distinctive nature, and furthermore, such an arrangement is able to tolerate relatively large positional errors associated with the movement of the body. Thus even if the body is laterally displaced by a significant extent from the required path, its position can still be determined providing that its field of view is within the boundaries of the relatively large reference area.

However, such an arrangement is very difficult to implement into a practical system, and moreover if the positional error should be so large that the optical field of view does not fall within the single reference area, guidance of the body is not possible.

SUMMARY OF THE INVENTION

The present invention seeks to provide an improved guidance system.

The above object is generally achieved according to this invention by a method for guiding, to a predetermined location, a moving body which generally comprises: viewing the surroundings of the moving body; correlating the viewed scene with stored reference locations, each having an effective area much smaller than the field of view of the moving body of its surrounding, with the plurality of reference locations being positioned generally along an expected approach path of the moving body to the predetermined location, with at least some of the reference locations being laterally displaced from said path, and with the extent of the lateral displacements reducing with decreasing distance from said predetermined location; and using the results of the correlation to guide the body to the predetermined location used to explain the mode of operation of the invention.

Although it is likely that some of the reference locations will lie on the expected approach path, this is not essential and in practice the actual positions of the reference locations will be largely dictated by the occurrence of distinctive visual features. The means which the body has for viewing its surroundings can take many forms, it may comprise a conventional television camera operating in the visible part of the spectrum, or it may rely on infra-red detectors, or use laser beam scanners.

The kind of viewing means will be chosen in dependence on the nature of the moving body and its surroundings. For example, the moving body may be an aircraft or the like, in which case the terrain over which it flies represents its surroundings. However, the moving body could be the manipulator arm of a robot used in a manufacturing process, in which case the work piece itself constitutes part of the surroundings.

It is clearly necessary to know in advance the predetermined location and the expected approach path so that suitable reference locations can be chosen, and be encoded in a form which permits their correlation with the viewing means. If the surroundings are constituted by terrain, the reference locations take the form of localised visual features of a distinctive nature, and are chosen such that there is only a single such visual feature within the field of the view of the viewing means at any one time. The localised visual features can be extracted from photographs of the terrain or from suitable maps, whichever is the more convenient. In the case of the manipulator arm, mentioned previously, distinctive visual features can be artificially inserted into the surroundings at convenient positions so as to ease the task of correlation.

Generally the reference locations will be held in the form of data patterns, and will be stored so as to be rapidly compared with the field of view of the scanning means. The data pattern is preferably in the form of binary digits, since in this form it can be used by a digital correlator, but it is, of course, necessary for the viewed scene to be converted to a compatible form of binary digits prior to correlation.

The predetermined location may be the final destination of the moving body, or it may instead be merely a position on a predetermined and unique path along which the body is subsequently required to move. In this latter case, the plurality of laterally displaced reference locations serve to acquire, or gather, the moving body and allow for the possibility that the body may be approach from the expected direction.

BRIEF DESCRIPTION OF THE DRAWINGS

The invention is further described by way of example with reference to the accompanying drawings in which.

DETAILED DESCRIPTION OF THE PREFERRED EMBODIMENTS

Figure 1:
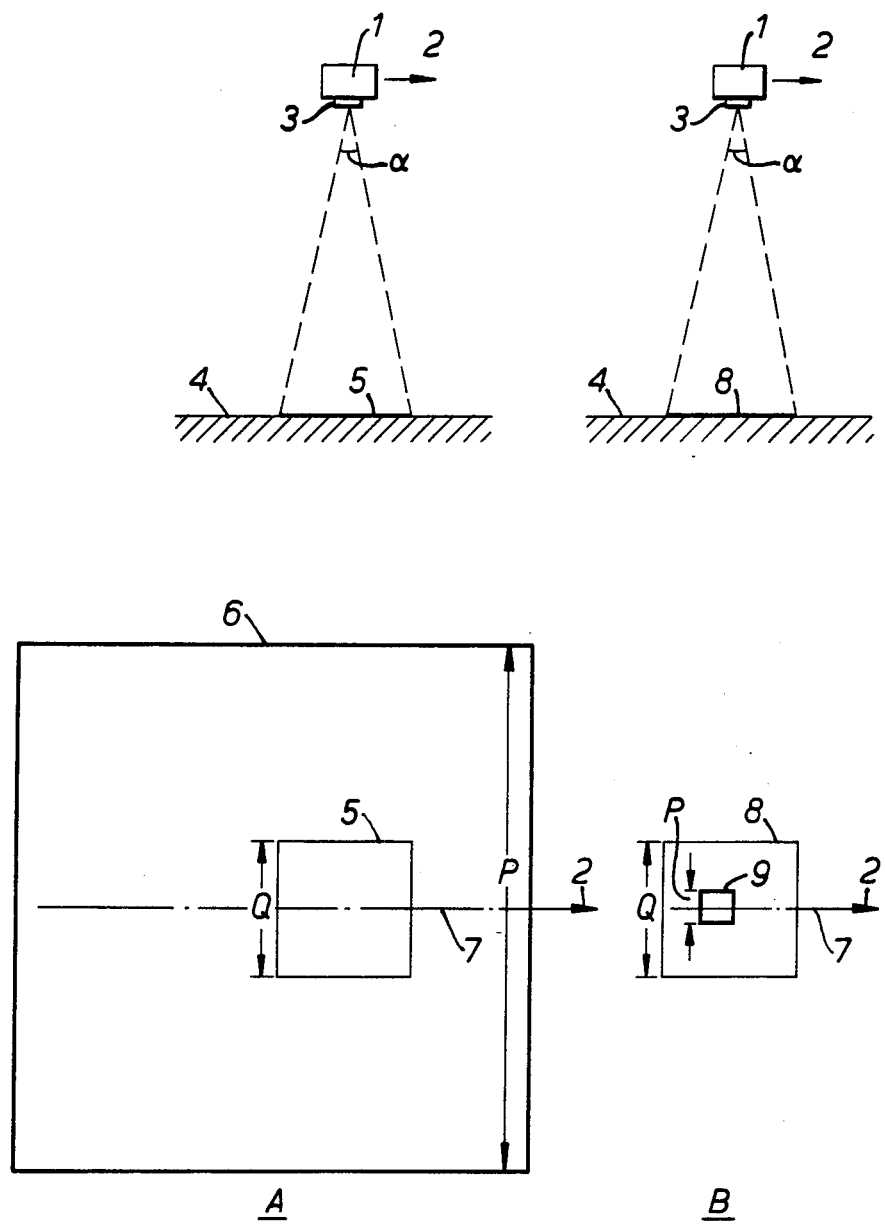
FIGS. 1 and 2 are explanatory diagrams used to explain the mode of operation of the invention.

Referring to FIG. 1, there are shown therein diagrams which enable the concept of the present invention to be compared with a previously known system. The conventional correlation system is represented in the left hand side of the Figure at A, and a moving body 1 moving in direction 2 is assumed to carry a downward looking television camera 3, which views the ground 4, which constitutes its surroundings, as it passes over it. The field of view 5 of the television camera 3 is determined by the viewing angle α which is chosen so as to achieve the best possible optical resolution in relation to the distance between the camera 3 and the ground 4. The reference area 6 is very much larger than the field of view 5 and represents an area which is stored at the body 1, in the form of digital binary data. The body 1 also includes a correlator which compares the viewed scene 5 with the reference data 6 until it finds a sufficiently good match. When a good match is found, it is assumed that the position of the field of view 5 within the larger reference area 6 has been precisely determined. If the linear dimension of the field of view 5 is Q and the linear dimension of the reference area 6 is P and that, by way of example, P=4Q, then the maximum distance by which the reference area 5 can depart from a predetermined path 7 is given in general by (P−Q)/2 and in this particular example by 3Q/2.

By way of comparison, the principle of a system in accordance with the invention is illustrated in the right hand side of FIG. 1, at B, where the optical system is assumed to be identical, i.e. the body 1 carries a television camera 3 having an field of view angle α and it moves in the direction 2. The field of view 8 of the television camera still has a linear dimension Q, but the size of the reference area 9 stored within the body 1 has a very small linear dimension P. Assuming that now P=Q/4, then the maximum permissible deviation of the body 1 from the path 7 is given by 3Q/8 if the position of the body 1 is to be found by correlation with the reference area 9. Thus the tolerance of the system to lateral drift or displacement is very much less than is the case represented by A in FIG. 1. However, it possesses the advantage that the correlation process is very much easier to accomplish in that the incoming television video signal can be compared relatively easily with the very small quantity of reference data which characterises area 9. Furthermore, the actual location of the reference area 9 can be chosen so that it encompasses just one very distinctive visual feature. This is in contrast with the previous system as exemplified by A where the incoming video information from the camera 3 has to be compared with an extremely large data base as represented by the area 6 and which may contain only few distinctive features widely spaced apart.

Thus the present invention reduces drammatically the amount of data which has to be stored and handled, thereby allowing the correlation to be accomplished in a realistically short period of time, i.e. the position of the body 1 can be determined before it has moved very far to a different position. Thus corrective action to bring the body on to a required path can be taken much more rapidly and with greater certainty of accuracy.

Figure 2:
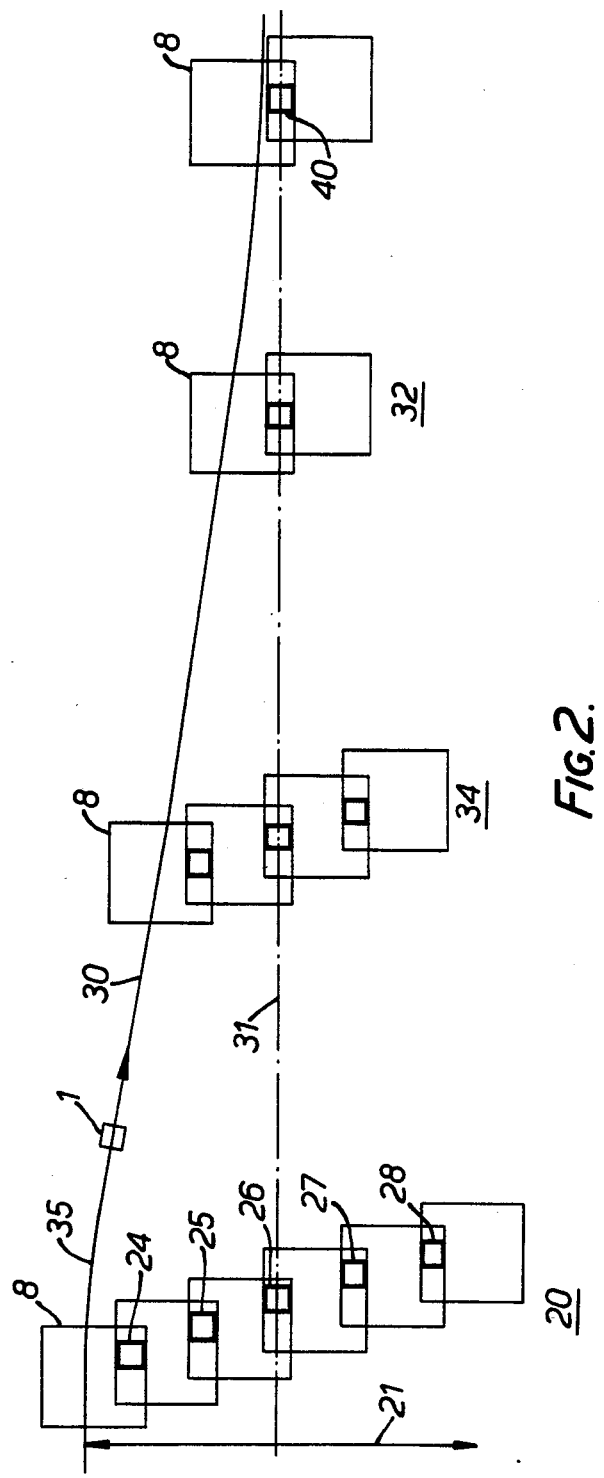

FIG. 2 illustrates a multi-channel correlation system which enables the capture distance of the body to be made very great, in principle as great as is necessary, without unrealistically increasing the amount of reference data which has to be carried by the body. It will be seen that the multi-channel system consists of a number of separate stages which progressively direct the moving body on to the predetermined path. This aspect is of considerable practical importance since initially the position of the body 1 may be unknown, and can vary randomly between wide limits. The initial capture stage 20 has a width 21, but requires only five small reference areas 24, 25, 26, 27, 28, the details of which can easily be stored on the body 1. Thus the capture width can be made as large as necessary without unrealistically increasing the data storage requirements or imposing excessive demands on the correlator process. This aspect is in contrast to the system A represented in FIG. 1, where the dimension P of reference area 6 (which represents the data storage requirement) wouldl have to be increased to an unacceptable level.

The actual path 30 of the body 1 is indicated on FIG. 2, and it is displaced from the expected path 31 leading to a predetermined location. The purpose of the system is to guide the moving body onto the path 31 (or sufficiently close to it so as to be encompassed within the field of view) by the time it reaches the location 32, so that thereafter it can be made to adhere sufficiently closely to the required path 33 by means of single, subsequent, reference areas 40, (only one of which is shown) positioned at suitable distances along the path 31.

When the actual position of the body 1 has been determined at the first capture stage 20, it is caused to change direction at point 35 and steered towards the path 31.

The second stage 34, redirects the body 1 onto the correct path, but requires only three reference areas. In practice, if the body 1 is moving very rapidly, further stages may be needed, before the body 1 can be brought sufficiently close to the path 31.

Figure 3:
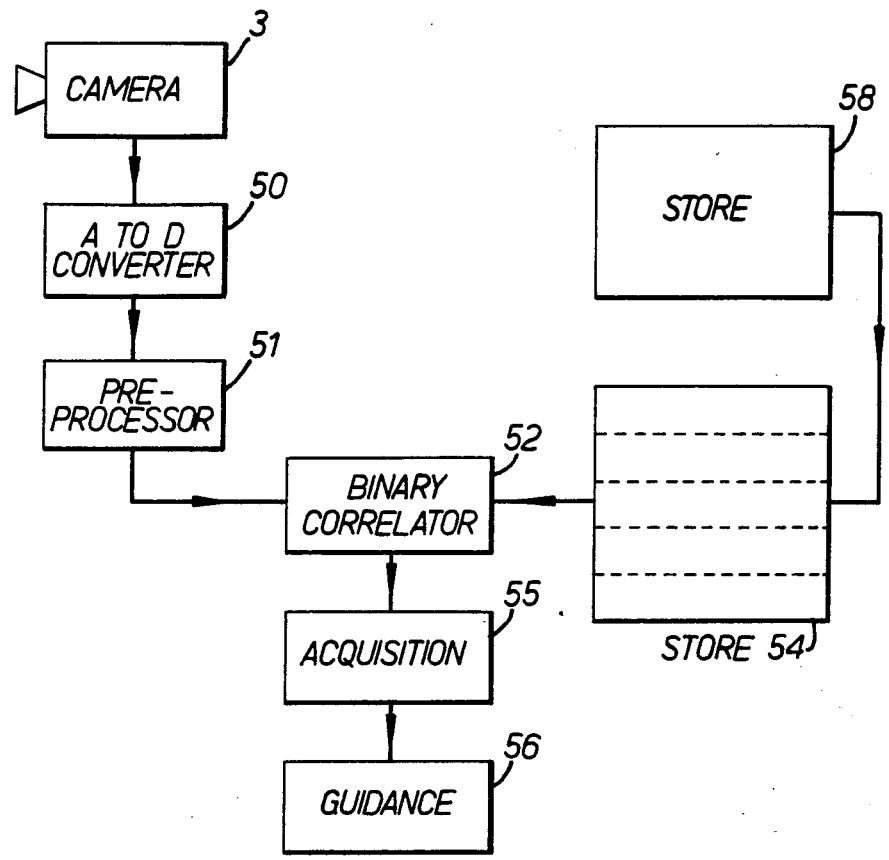
FIG. 3 shows, in diagramatic form, a guidance system which operates in accordance with this invention.

FIG. 3 shows in block diagrammatic form the way in which the correlation system is implemented. The camera 3 with its field of view of the terrain over which the body is passing generates an analogue video signal in conventional manner. This analogue signal is passed via a digital-to-analogue converter 50, which generates a digital signal representing the viewed scene, to a pre-processor 51 which converts the digital signal to a two level or binary signal, i.e. the incoming digital data which represents the greyscale content of the video signal is converted to one representing a two tone signal (e.g. black and white) from which intermediate grey tones have been removed. The digital data then passes from the pre-processor 51 and is applied to a binary correlator 52. The video information relates to the relatively large area 8 of the field of view of the camera 3 and the purpose of the binary correlator 52 is to compare the incoming digital data with relatively small reference areas held in active data stores 54 which can be readily and rapidly accessed. Binary correlators are, in themselves, known devices, and TRW devices such as type TDC 1004 or 1023 can be used.

The number of active data stores 54 corresponds to the maximum number of individual reference areas of any given correlation stage shown in FIG. 2.

The data relating to the individual reference areas shown in FIG. 2 (there are ten such areas) is initially held in a large store 58, and as correlation stage 20 is approached, the data relating to reference areas 24 to 28 is read out of store 58 and loaded into the respective active stores 54, which being small can be designed so that they can be very rapidly accessed. Each reference area in a respective one of stores 54 is accessed sequentially by the binary correlator 52, typically on a line by line basis, assuming that all five reference areas occur at about the same distance along the expected approach path 31.

If the field of view 8 of the camera 3 encompasses one of the reference areas 24–28 stored within the group of stores 54, a positive correlation is found by the acquisition block 55. The hposition of the body 1 at the instant the appropriate field of view was viewed is compared with the position of the reference area with which correlation has been found, and an appropriate instruction is provided to the guidance block 56, so as to steer the body towards the required predetermined path 31.

As the next correlation stage 34 is approached the group of stores 54 is re-loaded from store 58 with the three references required, as shown in FIG. 2. The correlation process is repeated and after a successful correlation has been achieved, the single reference area corresponding to capture stage 32 is loaded into one store of 54. The process then continues using the single reference area 40, and subsequent single reference areas (not shown) positioned at intervals along the path 31.

In FIG. 2, the body 1 is shown approaching the capture stage 20 at the maximum permissible distance from the predetermined path 31—its approach path is off-set from the predetermined path 31 by an amount such that the field of view 8 of the camera just includes the reference area 24 so that the body 1 can determine its own position. The additional areas of fields of view are indicated on this drawing, so that it can be seen that the lateral spacings of the adjacent reference areas 24 to 28 are such that each field of view includes at least one, and sometimes two, reference areas.

It is assumed that the actual path 30 of the body is sufficiently close to the required path 31 at reference stage 32 because the field of view 8 of the camera includes the single reference area which is actually on the path 31, even though the distance between the two paths is significant. This degree of accuracy is sufficient because the body 1 continues to move past stages 32 and 40 to subsequent stages (not shown), and great precision is required only at the final stage, i.e. at the ultimate destination.

Although of general application, the invention is particularly suitable for the navigation of an aircraft or missile. Conventional inertial navigation systems are liable to drift, which although small, may be significant if allowed to develop uncorrected for a long period of time. This can happen if the aircraft is flying over featureless terrain, e.g. sea or desert, and in the former case the capture stage 20 shown in FIG. 2 would typically represent a strip of land lying along the coastline. Thus an aircraft making a landfall at an unknown location can quickly orientate itself and be guided to its eventual destination. Once the aircraft has been successfully guided onto its required path (e.g. path 31 on FIG. 2), the subsequent reference areas can be spaced apart by relatively long distances since they are needed only to enable the conventional inertial navigation system to be updated before its drift becomes too large.

We claim:

1. A method of guiding a moving body to a predetermined location, comprising the steps of: storing data corresponding to a plurality of reference locations which are positioned generally along an expected approach path of a moving body, with at least some of said reference locatons being laterally displaced from said path, and with the extent of the lateral displacements reducing with decreasing distance from said predetermined location; causing the moving body to move toward said predetermined location; viewing the surroundings of the moving body along its path of movement by means of a viewing device having a field of view substantially larger than the effective area of each of said reference locations to provide output signals corresponding to said field of view; correlating the output signals corresponding to the field of view of the viewing device with said stored reference location data; and using the results of said correlation to guide the moving object to said desired location.

2. A method as defined in claim 1 wherein the plurality of reference locations are arranged in groups which are relatively widely spaced apart along said expected approach path, with the overall lateral displacements of reference locations within given groups progressively reducing in the direction towards said predetermined location.

3. A method as defined in claim 2 wherein, in each group containing a plurality of reference locations, at least one reference location lies close to or includes part of said expected approach path.

4. A method as defined in claim 2 wherein said step of correlating includes, as the moving body approaches a particular group of said reference locations, comparing only the stored data representative of said particular group of reference locations with said output signals corresponding to said field of view until correlation therewith is obtained and producing an output signal indicating same; and wherein said step of guiding includes modifying the direction of the moving body in dependence on the result of said correlation so as to direct the moving body towards the next said group in a direction converging with said expected approach path.

5. A method as defined in claim 4 wherein said step of storing includes storing the data corresponding to all of said reference locations in a first memory; and further comprising: reading the data corresponding to the reference locations of only said particular group of reference locations into a second smaller memory prior to said step of correlating; and utilizing only the data stored in said second memory during said step of correlating.

6. A method as defined in claim 2 wherein, in each said group containing a plurality of reference locations, the individual said reference locations are displaced from each other in the direction of the expected approach path by amounts which are small as compared with maximum lateral displacement within that group.

* * * * *